United States Patent
Ghosh et al.

(10) Patent No.: US 9,168,810 B2
(45) Date of Patent: Oct. 27, 2015

(54) HEATING AND COOLING SYSTEM FOR OCCUPANTS OF THE REAR PORTION OF A VEHICLE

(71) Applicant: DELPHI TECHNOLOGIES, INC., Troy, MI (US)

(72) Inventors: Debashis Ghosh, Williamsville, NY (US); Mingyu Wang, Amherst, NY (US); Prasad S. Kadle, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 299 days.

(21) Appl. No.: 13/647,611

(22) Filed: Oct. 9, 2012

(65) Prior Publication Data
US 2014/0096945 A1      Apr. 10, 2014

(51) Int. Cl.
*B60H 1/00* (2006.01)
*B60H 1/24* (2006.01)

(52) U.S. Cl.
CPC ............ *B60H 1/00742* (2013.01); *B60H 1/244* (2013.01); *B60H 1/247* (2013.01)

(58) Field of Classification Search
CPC ................ B60H 1/00207; B60H 2001/00242; B60H 2001/00214
USPC ......... 165/202, 203, 204, 42, 43, 44
See application file for complete search history.

(56) References Cited

U.S. PATENT DOCUMENTS

| | | | | |
|---|---|---|---|---|
| 1,434,423 A | * | 11/1922 | Bassett et al. | 165/44 |
| 1,903,037 A | * | 3/1933 | Fraver | 165/43 |
| 2,014,552 A | * | 9/1935 | Bradburn | 165/43 |
| 2,103,104 A | * | 12/1937 | Young | 165/43 |
| 2,116,145 A | * | 5/1938 | Findley | 165/44 |
| 2,134,724 A | * | 11/1938 | McClanahan et al. | 165/43 |
| 2,180,760 A | * | 11/1939 | Mayo | 165/43 |
| 2,183,996 A | * | 12/1939 | Mayo | 165/44 |
| 2,203,477 A | * | 6/1940 | Wahlberg | 165/43 |
| 2,212,503 A | * | 8/1940 | Nickell | 165/202 |
| 2,213,016 A | * | 8/1940 | Perkins | 165/43 |
| 2,268,478 A | * | 12/1941 | Fehrer | 165/43 |
| 2,295,750 A | * | 9/1942 | Norris et al. | 165/43 |
| 2,319,002 A | * | 5/1943 | Kramer | 454/141 |
| 2,336,733 A | * | 12/1943 | Hull | 62/62 |
| 2,476,295 A | * | 7/1949 | Hans | 165/203 |
| 2,627,218 A | * | 2/1953 | Katz | 454/139 |

(Continued)

FOREIGN PATENT DOCUMENTS

| | | |
|---|---|---|
| DE | 102004028920 A1 | 1/2006 |
| DE | 102006045755 A1 | 4/2008 |

(Continued)

*Primary Examiner* — Ljiljana Ciric
(74) *Attorney, Agent, or Firm* — Brinks Gilson & Lione

(57) ABSTRACT

A heating, ventilation, and air conditioning (HVAC) system is configured for use in a vehicle. A first air moving device blowing air through a heat exchanger provides a first airstream having a first temperature to a second air moving device configured to generate a second airstream having a second temperature that is different from the first temperature. The second airstream is a mixture of the first airstream and cabin air that is drawn from a rear portion of the vehicle cabin. The second air moving device may be disposed in the rear portion of the vehicle. The HVAC system further includes a nozzle that is configured to direct the second airstream toward an occupant in the rear portion of the vehicle cabin to provide spot conditioning.

10 Claims, 2 Drawing Sheets

(56) References Cited

U.S. PATENT DOCUMENTS

| | | | | |
|---|---|---|---|---|
| 2,640,409 A * | 6/1953 | Hans | | 454/99 |
| 2,656,779 A * | 10/1953 | Simi | | 454/105 |
| 2,667,336 A * | 1/1954 | Lehane et al. | | 165/249 |
| 2,735,657 A * | 2/1956 | Owen | | 165/202 |
| 2,737,874 A * | 3/1956 | Gallay et al. | | 454/76 |
| 2,783,622 A * | 3/1957 | Bourassa | | 62/238.3 |
| 2,817,282 A * | 12/1957 | Dolison | | 454/139 |
| 2,893,700 A * | 7/1959 | Boylan et al. | | 165/272 |
| 2,922,290 A * | 1/1960 | Carraway | | 62/133 |
| 3,008,694 A * | 11/1961 | Todd | | 165/42 |
| 3,127,931 A * | 4/1964 | Johnson | | 165/43 |
| 3,128,608 A * | 4/1964 | Kleist | | 165/43 |
| 3,494,413 A * | 2/1970 | Dixon | | 165/43 |
| 3,595,029 A * | 7/1971 | Lende, Jr. | | 165/42 |
| 3,672,445 A * | 6/1972 | Carson | | 165/42 |
| 4,157,113 A * | 6/1979 | Karran et al. | | 165/42 |
| 4,272,015 A * | 6/1981 | Houser | | 165/43 |
| 4,324,286 A * | 4/1982 | Brett | | 165/202 |
| 4,344,356 A * | 8/1982 | Casterton et al. | | 454/139 |
| 4,364,513 A * | 12/1982 | Tsuzuki et al. | | 165/43 |
| 4,375,754 A * | 3/1983 | Okura | | 165/43 |
| 4,420,033 A * | 12/1983 | Franz | | 165/202 |
| 4,434,932 A * | 3/1984 | Hara et al. | | 165/43 |
| 4,462,218 A * | 7/1984 | Yamanaka | | 165/43 |
| 4,470,270 A * | 9/1984 | Takada et al. | | 165/42 |
| 4,478,274 A * | 10/1984 | Naganoma et al. | | 165/204 |
| 4,482,009 A * | 11/1984 | Nishimura et al. | | 165/203 |
| 4,537,245 A * | 8/1985 | Nishimura et al. | | 165/203 |
| 4,586,652 A * | 5/1986 | Sakurai | | 165/202 |
| 4,612,975 A * | 9/1986 | Ikari | | 165/43 |
| 4,665,971 A * | 5/1987 | Sakurai | | 165/203 |
| 4,681,153 A * | 7/1987 | Uchida | | 165/202 |
| 4,730,662 A * | 3/1988 | Kobayashi | | 165/204 |
| 4,763,564 A * | 8/1988 | Czarnecki et al. | | 454/75 |
| 4,800,951 A * | 1/1989 | Sakurai | | 165/203 |
| 4,819,715 A * | 4/1989 | Kobayashi | | 165/203 |
| 4,890,460 A * | 1/1990 | Takasi et al. | | 165/43 |
| 4,901,788 A * | 2/1990 | Doi | | 165/204 |
| 4,913,347 A * | 4/1990 | Burst et al. | | 165/43 |
| 4,945,977 A * | 8/1990 | D'Agaro | | 165/43 |
| 4,949,779 A * | 8/1990 | Kenny et al. | | 165/203 |
| 4,991,405 A * | 2/1991 | Sakano | | 165/42 |
| 4,996,849 A * | 3/1991 | Burst et al. | | 165/202 |
| 5,016,704 A * | 5/1991 | Ono | | 165/203 |
| 5,042,566 A * | 8/1991 | Hildebrand | | 165/42 |
| 5,042,567 A * | 8/1991 | Kajimoto et al. | | 165/42 |
| 5,086,628 A * | 2/1992 | Hashimoto | | 165/203 |
| 5,156,204 A * | 10/1992 | Doi | | 165/204 |
| 5,167,129 A * | 12/1992 | Akasaka | | 165/43 |
| 5,181,553 A * | 1/1993 | Doi | | 165/203 |
| 5,186,237 A * | 2/1993 | Adasek et al. | | 165/42 |
| 5,195,574 A * | 3/1993 | Tanaka et al. | | 165/203 |
| 5,450,894 A * | 9/1995 | Inoue et al. | | 165/43 |
| 5,765,635 A * | 6/1998 | Rhee | | 165/203 |
| 5,860,593 A * | 1/1999 | Heinle et al. | | 165/204 |
| 5,921,100 A * | 7/1999 | Yoshinori et al. | | 165/43 |
| 6,059,018 A * | 5/2000 | Yoshinori et al. | | 165/42 |
| 6,105,667 A * | 8/2000 | Yoshinori et al. | | 165/202 |
| 6,120,370 A * | 9/2000 | Asou et al. | | 165/42 |
| 6,135,201 A * | 10/2000 | Nonoyama et al. | | 165/202 |
| 6,152,217 A * | 11/2000 | Ito et al. | | 165/202 |
| 6,206,092 B1 * | 3/2001 | Beck et al. | | 165/203 |
| 6,230,795 B1 * | 5/2001 | Tsunooka et al. | | 165/203 |
| 6,244,335 B1 * | 6/2001 | Nakamura et al. | | 165/203 |
| 6,282,911 B1 * | 9/2001 | Watanabe et al. | | 62/244 |
| 6,308,770 B1 * | 10/2001 | Shikata et al. | | 165/42 |
| 6,332,330 B1 * | 12/2001 | Loup et al. | | 165/42 |
| 6,361,429 B1 * | 3/2002 | Pawlak et al. | | 454/139 |
| 6,415,851 B1 * | 7/2002 | Hall et al. | | 165/42 |
| 6,470,960 B2 * | 10/2002 | Kampf et al. | | 165/42 |
| 6,491,578 B2 * | 12/2002 | Yoshinori et al. | | 454/139 |
| 6,851,470 B2 * | 2/2005 | Laukhuf | | 165/202 |
| 6,886,350 B2 * | 5/2005 | Petesch et al. | | 165/42 |
| 6,997,004 B1 * | 2/2006 | Pittman | | 62/244 |
| 7,001,264 B2 * | 2/2006 | Hayashi et al. | | 454/144 |
| 7,222,665 B2 * | 5/2007 | Ichishi et al. | | 165/202 |
| 7,377,309 B2 * | 5/2008 | Tamatsu | | 165/202 |
| 7,434,608 B2 * | 10/2008 | Shindo et al. | | 165/42 |
| 7,819,171 B2 * | 10/2010 | Alberternst et al. | | 165/42 |
| 7,931,209 B2 * | 4/2011 | Mola et al. | | 165/202 |
| 8,267,155 B2 * | 9/2012 | Katsuki et al. | | 165/42 |
| 8,633,424 B2 * | 1/2014 | Chernyavsky et al. | | 165/202 |
| 2001/0001417 A1 * | 5/2001 | Beck et al. | | 165/203 |
| 2001/0004008 A1 * | 6/2001 | Aoki et al. | | 165/43 |
| 2001/0004015 A1 * | 6/2001 | Bendell et al. | | 165/203 |
| 2001/0022222 A1 * | 9/2001 | Aoki et al. | | 165/203 |
| 2001/0029162 A1 * | 10/2001 | Yoshinori et al. | | 454/137 |
| 2002/0000314 A1 * | 1/2002 | Danieau | | 165/203 |
| 2002/0007944 A1 * | 1/2002 | Schwarz | | 165/203 |
| 2002/0011325 A1 * | 1/2002 | Shikata et al. | | 165/43 |
| 2002/0014331 A1 * | 2/2002 | Bendell et al. | | 165/203 |
| 2002/0017383 A1 * | 2/2002 | Vincent | | 165/204 |
| 2002/0036081 A1 * | 3/2002 | Ito et al. | | 165/202 |
| 2003/0102120 A1 * | 6/2003 | Henry et al. | | 165/203 |
| 2003/0121640 A1 * | 7/2003 | Currle et al. | | 165/42 |
| 2004/0016537 A1 * | 1/2004 | Nakamura et al. | | 165/204 |
| 2004/0031602 A1 * | 2/2004 | Sugiura | | 165/203 |
| 2004/0185766 A1 * | 9/2004 | Hayashi et al. | | 454/156 |
| 2005/0011640 A1 * | 1/2005 | Tohda et al. | | 165/202 |
| 2005/0028969 A1 * | 2/2005 | Petesch et al. | | 165/202 |
| 2005/0072554 A1 * | 4/2005 | Shindo et al. | | 165/42 |
| 2005/0087325 A1 * | 4/2005 | Roland et al. | | 165/42 |
| 2005/0126774 A1 * | 6/2005 | Yamaguchi et al. | | 165/204 |
| 2005/0257925 A1 * | 11/2005 | Koukouravas | | 165/202 |
| 2005/0267646 A1 * | 12/2005 | Ichishi et al. | | 165/204 |
| 2005/0269071 A1 * | 12/2005 | Simmet et al. | | 165/202 |
| 2006/0000592 A1 * | 1/2006 | Bosquet et al. | | 165/202 |
| 2006/0042780 A1 * | 3/2006 | Beck et al. | | 165/42 |
| 2006/0207758 A1 * | 9/2006 | Elliot et al. | | 165/202 |
| 2007/0000658 A1 * | 1/2007 | Koukouravas et al. | | 165/202 |
| 2007/0044491 A1 * | 3/2007 | Prince et al. | | 62/244 |
| 2007/0095098 A1 * | 5/2007 | Lee et al. | | 62/527 |
| 2007/0144727 A1 * | 6/2007 | Hirayama et al. | | 165/203 |
| 2007/0144728 A1 * | 6/2007 | Kinmartin et al. | | 165/204 |
| 2007/0158047 A1 * | 7/2007 | Natsume | | 165/43 |
| 2007/0215339 A1 * | 9/2007 | Kumada et al. | | 165/203 |
| 2007/0293135 A1 * | 12/2007 | Hori et al. | | 165/43 |
| 2008/0085672 A1 * | 4/2008 | Creed et al. | | 454/69 |
| 2008/0149300 A1 * | 6/2008 | Matsukawa | | 165/43 |
| 2009/0078392 A1 * | 3/2009 | Burkhardt et al. | | 165/42 |
| 2009/0288800 A1 * | 11/2009 | Kang et al. | | 165/42 |
| 2010/0193174 A1 * | 8/2010 | Nemoto | | 165/202 |
| 2011/0114739 A1 | 5/2011 | Misumi et al. | | |
| 2012/0247714 A1 * | 10/2012 | Morris et al. | | 165/42 |
| 2012/0247747 A1 * | 10/2012 | DiGasbarro et al. | | 165/204 |
| 2012/0312520 A1 * | 12/2012 | Hoke et al. | | 165/203 |
| 2013/0037252 A1 * | 2/2013 | Major et al. | | 165/202 |
| 2013/0059522 A1 * | 3/2013 | Ota et al. | | 165/204 |
| 2013/0068440 A1 * | 3/2013 | Kamiyama | | 165/202 |
| 2013/0146248 A1 * | 6/2013 | Kim et al. | | 165/42 |
| 2013/0149951 A1 * | 6/2013 | Park et al. | | 165/42 |

FOREIGN PATENT DOCUMENTS

| | | |
|---|---|---|
| DE | 202010014771 U1 | 1/2012 |
| DE | 102011000177 A1 | 7/2012 |

* cited by examiner

HEATING AND COOLING SYSTEM FOR OCCUPANTS OF THE REAR PORTION OF A VEHICLE

TECHNICAL FIELD OF INVENTION

The invention generally relates to a heating, ventilation and air conditioning (HVAC) system for a vehicle, and more particularly relates to an HVAC system configured to provide a perceived comfortable thermal environment to an occupant seated in a rear portion of a vehicle cabin.

BACKGROUND OF INVENTION

Heat exchangers used to heat and cool air for heating, ventilation and air conditioning (HVAC) systems in a vehicle are typically located in the front portion of the vehicle. In vehicles such as sport utility vehicles (SUV), crossover utility vehicles (CUV) or minivans that have a second and third row of seats in a rear portion of the vehicle cabin, the HAVC system typically provides an airstream of conditioned air having the proper temperature and flow rate to provide a comfortable thermal environment for occupants in a rear portion of the vehicle cabin. A duct 3 to 4 meters (9.843 to 13.12 feet) long and capable of carrying an airstream with a flow rate of about 94.4 L/s (200 CFM) may be required to deliver the airstream from the HVAC system to the rear portion of a vehicle cabin to the second and third row seats. Packaging a duct of this length in a vehicle may be difficult due to limited space within the vehicle. Additionally, a long plenum with the multiple turns that are required to package the plenum in the vehicle may have a large pressure drop that requires greater power from an air moving device to deliver the necessary flow rate for the airstream. Alternatively, a dedicated rear HVAC system may be include a heat exchanger in the rear portion of the vehicle, but this undesirably adds cost and complexity to the vehicle.

SUMMARY OF THE INVENTION

In accordance with one embodiment of this invention, a heating, ventilation, and air conditioning (HVAC) system configured for use in a vehicle to provide a perceived comfortable thermal environment to an occupant seated in a rear portion of a vehicle cabin is provided. The HVAC system includes a heat exchanger disposed in a front portion of the vehicle. The heat exchanger is configured to provide a first airstream characterized as having a first temperature. Any heat exchanger included in said system may be located in the front portion of the vehicle. The HVAC system also includes an air moving device configured to generate a second airstream characterized as having a second temperature. The air moving device may be disposed in the rear portion of the vehicle. The second airstream comprises a mixture of the first airstream and cabin air drawn from the rear portion of the vehicle cabin. A mixing ratio of the first airstream to the cabin air may be between 1:2 and 2:7. The HVAC system further includes a nozzle configured to direct the second airstream toward a location in the rear portion of the vehicle cabin. The nozzle may be directed toward the location of a thermally sensitive portion of the occupant.

The HVAC system may further include a control vane coupled to a servo mechanism configured to control the first airstream, an occupant sensor configured to determine the presence of an occupant in the rear portion of the vehicle cabin, and a controller in communication with the occupant sensor and the servo mechanism. The controller may be configured to reduce the flow rate of the first airstream when the occupant sensor does not detect the presence of an occupant in the rear portion of the vehicle cabin. The controller may also be in communication with the air moving device. The controller may be configured to control the air moving device effective to reduce the flow rate of the second airstream when the occupant sensor does not detect the presence of an occupant in the rear portion of the vehicle cabin.

The air moving device may include a mixing box configured to mix the first airstream with the cabin air to form the second airstream. The mixing box may be disposed in the rear portion of the vehicle.

The HVAC system may be configured to cool the vehicle cabin. A portion of the first airstream may be directed into the vehicle cabin effective to establish a cabin air temperature of about 30° C. (about 86 degrees Fahrenheit) in the rear portion of the vehicle cabin. The first temperature may be about 12° C. (about 54 degrees Fahrenheit) and the second temperature may be about 24° C. (about 75 degrees Fahrenheit) when the elapsed system run time is over a threshold time. When the HVAC system is configured to cool the cabin, the thermally sensitive portion may be selected from the group consisting of a head portion, a chest portion, and a lap portion.

The HVAC system may be configured to heat the vehicle cabin. A portion of the first airstream may be directed into the vehicle cabin effective to establish a cabin air temperature of about 16° C. (about 61 degrees Fahrenheit) in the rear portion of the vehicle cabin. The first temperature may be about 45° C. and the second temperature may be about 35° C. when the elapsed system run time is over the threshold time. When the HVAC system is configured to heat the cabin, the thermally sensitive portion is selected from the group consisting of a foot portion, a chest portion, and a hand portion.

In another embodiment of the present invention, an air moving device configured for use in a heating, ventilation, and air conditioning system for a vehicle to provide an airstream to an occupant seated in a rear portion of a vehicle cabin is provided. The air moving device includes a housing configured to define a first inlet configured to receive a first airstream from a heat exchanger disposed in a front portion of the vehicle. The housing is further configured to define a second inlet configured to receive cabin air from the rear portion of the vehicle cabin. The air moving device also includes an air blower configured to mix the first airstream with the cabin air, thereby generating a second airstream. The housing defines an outlet configured to direct the second airstream to a nozzle in the rear portion of the vehicle cabin. The housing may define a mixing box configured to mix the first airstream with the cabin air to form the second airstream. The first airstream may be characterized as having a first temperature and the second airstream may be characterized as having a second temperature.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
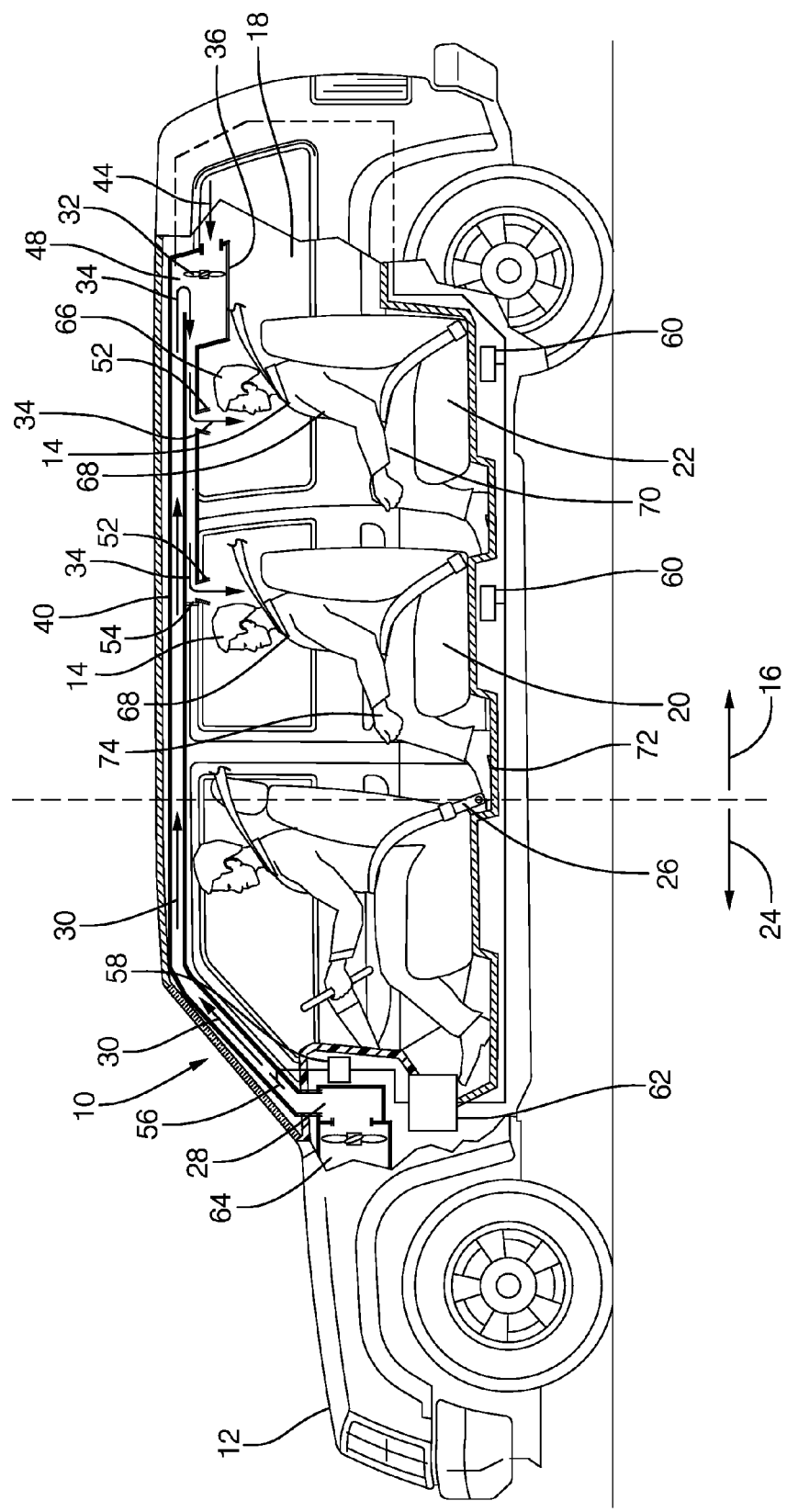
FIG. 1 is a cut-away side view of a vehicle including a heating, ventilation and air conditioning (HAVC) system in accordance with one embodiment.

FIG. 1 illustrates a non-limiting example of a heating, ventilation, and air conditioning (HVAC) system 10 configured for use in a vehicle 12 to provide a perceived comfortable thermal environment to an occupant 14 seated in a rear portion 16 of a vehicle cabin 18, such as an occupant 14 of a second row seat 20 or third row seat 22 in a sport utility vehicle (SUV), crossover utility vehicle (CUV) or minivan. The HVAC system 10 as described may also be adapted to be used in other types of vehicles, including sedans, trucks, busses, or airplanes.

The HVAC system 10 is configured to provide spot conditioning to the occupants 14 of the second row seats 20 and third row seats 22. As used herein, spot conditioning means directing a stream of air at a specific temperature and flow rate toward a thermally sensitive portion of the occupant's body to provide a heat loss rate for the sensitive portion equivalent to the heat loss rate at a comfortable temperature, such as a 24° C. (75 degrees Fahrenheit) cabin temperature.

The thermal comfort of an occupant 14 in a vehicle cabin 18 may be primarily determined by the heat loss rate of the occupant 14. The occupant 14 may typically be comfortable in an ambient temperature of 24° C. (75 degrees Fahrenheit). Therefore, when the heat loss rate of the occupant 14 is higher than when in an environment with an ambient temperature of 24° C. (75 degrees Fahrenheit), the occupant 14 tends to feel cooler. When the heat loss rate of the occupant 14 is lower than when in an environment with an ambient temperature of 24° C. (75 degrees Fahrenheit), the occupant 14 tends to feel warmer.

It has been estimated that a 30% energy savings may be realized if the ambient temperature in the rear portion 16 of the cabin is maintained at 30° C. (86 degrees Fahrenheit) rather than 24° C. (75 degrees Fahrenheit). Rather than maintaining the entire vehicle cabin 18 at a comfortable ambient temperature of 24° C. (75 degrees Fahrenheit), in order to reduce power required to cool the vehicle cabin 18 it may be advantageous to maintain the front portion 24 of the vehicle cabin 18 at a temperature of 24° C. (75 degrees Fahrenheit) and provide spot conditioning to maintain the heat loss rate of the occupant 14 in the rear portion 16 of the vehicle cabin 18 at a rate that is equivalent to an ambient temperature of 24° C. (75 degrees Fahrenheit) (a desired or comfortable heat loss rate) while maintaining a higher ambient temperature, for example 30° C. (86 degrees Fahrenheit) in the rear portion 16 of the vehicle cabin 18. As used herein, the front portion 24 of the vehicle 12 is the portion of the vehicle 12 forward of a seat belt anchor point 26 for the driver's seat. The occupant 14 may be effectively thermally isolated from the elevated 30° C. (86 degrees Fahrenheit) ambient temperature of the rear portion 16 of the vehicle cabin 18 by directing an airstream at a specific temperature and air flow rate so that the heat loss rate of the occupant 14 is generally the same as would occur at an ambient temperature of 24° C. (75 degrees Fahrenheit). The airstream may effectively isolate the occupant 14 from the elevated cabin temperature of the rear portion 16 of the vehicle cabin 18. This may result in lower energy requirements from an air conditioning compressor supplying compressed refrigerant to the heat exchanger 28, since a reduced volume of cooled air may be required to maintain the rear portion 16 of the vehicle cabin 18 at 30° C. (86 degrees Fahrenheit).

When heating the vehicle cabin 18, the ambient temperature in the rear portion 16 of the cabin may be maintained at 16° C. (61 degrees Fahrenheit). Energy savings realized by maintaining an ambient temperature in the rear portion 16 of the cabin at 16° C. (61 degrees Fahrenheit) rather than 24° C. (75 degrees Fahrenheit) when heating the vehicle cabin 18 are typically lower in vehicles with internal combustion (IC) engines since the energy used for heating is typically waste heat from the IC engine. However, in vehicles with electric or hybrid electric powertrains that do not create a significant amount of waste heat, energy from the vehicle batteries must be supplied to heat the vehicle cabin 18; therefore similar energy savings for heating may be realized.

It has been observed that different portions or areas of the surface of a human body have different sensitivity to heat loss caused by the ambient temperature. For example, comfort perception in cold conditions is primarily dictated by human thermal sensation of the extremities, e.g., hands and feet. Therefore, it may be advantageous to direct the airstream to portions of the occupant's body that are most thermally sensitive, such as the extremities.

A model of a human body identifying thermal sensation and thermal comfort sensitivity of various body portions to temperature has been developed to determine which body portions to heat or cool to achieve thermal comfort through spot conditioning. As an illustrative example, the static local sensation equation by Zhang et al. ["Thermal Sensation and Comfort Models for Non-Uniform and Transient Environments: Part I: Local Sensation of Individual Body Parts", Indoor Environmental Quality (IEQ), Center for the Built Environment, Center for Environmental Design Research, University of California—Berkeley, 2009] may be used to determine the sensitivity of body portions to localized heating or cooling.

As illustrated in FIG. 1, the HVAC system 10 includes a heat exchanger 28 disposed in the front portion 24 of the vehicle 12. As used herein the front portion 24 of the vehicle 12 is the portion of the vehicle 12 forward of the seat belt anchor point 26. The heat exchanger 28 is configured to provide a first airstream 30 that is characterized as having a first temperature. The first temperature may be characterized as being uncomfortable when the first airstream 30 is impinging on the occupant 14.

As a non-limiting example, the heat exchanger 28 may be an air conditioning evaporator configured to cool the first airstream 30 by decreasing the pressure of a refrigerant passing through a fluid to air heat exchanger. Alternatively, the heat exchanger 28 may be a heater core configured to heat the first airstream 30 by passing engine coolant through a fluid to air heat exchanger. As another non-limiting example, the heat exchanger 28 may be a thermoelectric device configured to heat or cool the first airstream 30, depending on the voltage applied to the thermoelectric device. Alternatively, the heat exchanger 28 may be an electrical resistance heater or a secondary loop air conditioning system. The design, construction, and use of these heat exchangers are well known to those skilled in the art.

The HVAC system 10 also includes an air moving device 32 configured to generate a second airstream 34 characterized as having a second temperature. The second temperature may be distinct from the first temperature. The second airstream 34 comprises a mixture of the first airstream 30 and cabin air 44 from the rear portion 16 of the vehicle cabin 18. The air moving device 32 may be located in the rear portion 16 of the vehicle 12. Since the first airstream 30 may have a first temperature that is uncomfortable to the occupant 14 because it is too cold or too hot, by mixing the first airstream 30 with the cabin air 44, the temperature of the second airstream 34 may be raised or lowered to have a second temperature that is sufficient to provide a comfortable thermal environment for occupants 14 in a rear portion 16 of the vehicle cabin 18. Mixing the first airstream 30 with the cabin air 44 may also increase the flow rate of the second airstream 34 relative to the first airstream 30 sufficient to provide a comfortable thermal environment for occupants 14 in a rear portion 16 of the vehicle cabin 18. Therefore, the HVAC system 10 may provide the advantage of reducing the flow rate of the first airstream 30 delivered to the rear portion 16 of the vehicle 12 by a first plenum 40. The lower flow rate may allow the first plenum 40 to have a smaller cross section, simplifying packaging of the first plenum 40 in the vehicle 12. The lower flow rate may also require less power from an air moving device and generate less noise to deliver the necessary flow rate for the first airstream 30.

Figure 2:
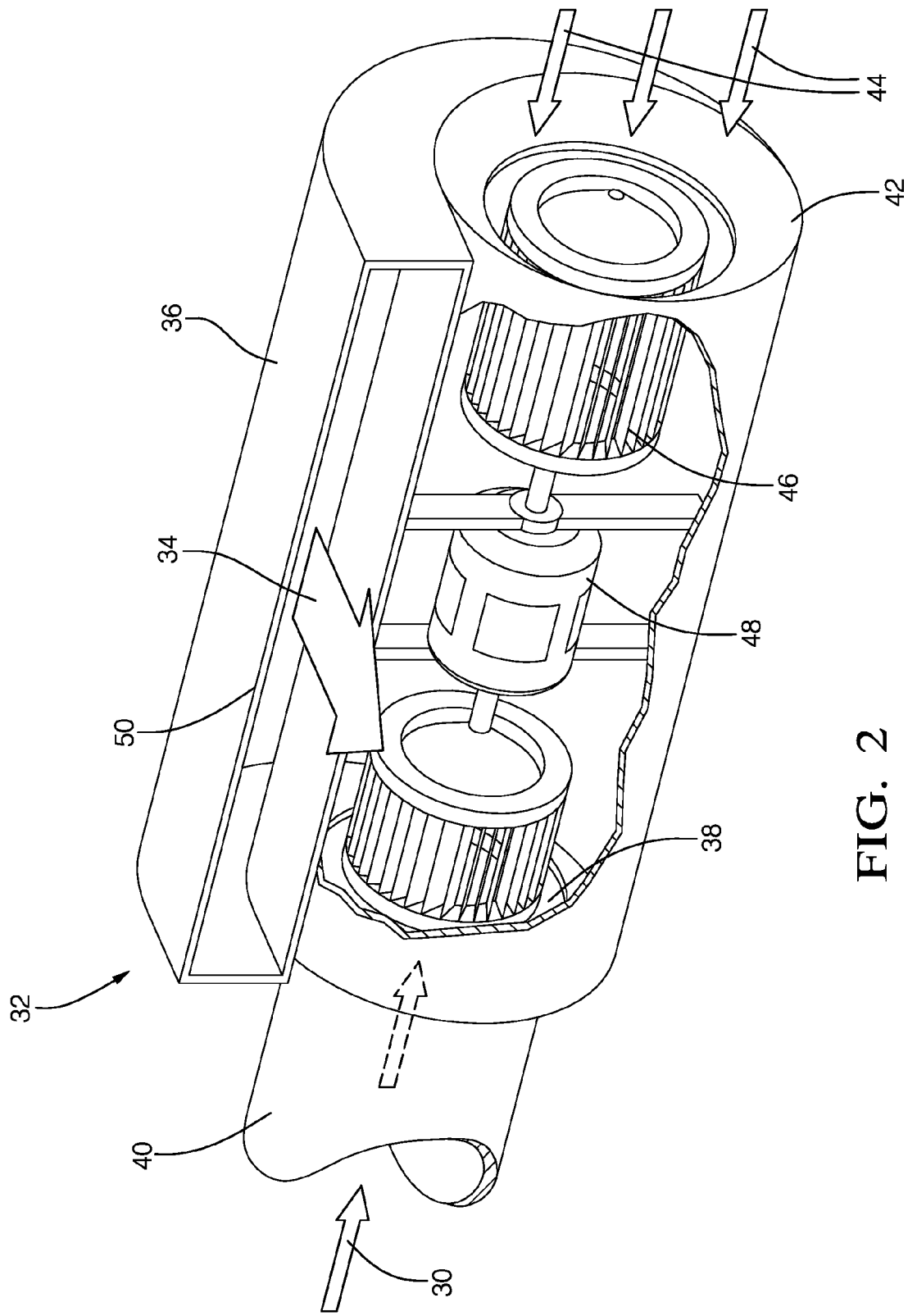
FIG. 2 is a cut-away perspective view of an air moving device configured for use with an HVAC system in accordance with one embodiment.

FIG. 2 illustrates a non-limiting example of the air moving device 32. The air moving device 32 may include a housing 36 defining a first inlet 38 configured to receive the first airstream 30 from the heat exchanger 28. A first plenum 40 may be configured to direct the first airstream 30 from the heat exchanger 28 to the first inlet 38. The housing 36 may also define a second inlet 42 configured to receive cabin air 44 from the rear portion 16 of the vehicle cabin 18. The air moving device 32 may also include an air blower 46 configured to mix the first airstream 30 with the cabin air 44, thereby generating a second airstream 34. The air blower 46 may be a centrifugal blower, axial fan, or other device well known to those skilled in the art effective to create an air pressure differential within the housing 36. The housing 36 further defines an outlet 50 configured to direct the second airstream 34 to a nozzle 52 in the rear portion 16 of the vehicle cabin 18. The housing 36 may also define a mixing box 48 configured to mix the first airstream 30 with the cabin air 44 to form the second airstream 34. The mixing box 48 may be disposed in the rear portion 16 of the vehicle 12. As used herein, the rear portion 16 of the vehicle 12 is the portion of the vehicle 12 rearward of the seat belt anchor point 26.

As illustrated in FIG. 1, the nozzle 52 is configured to direct the second airstream 34 toward a location in the rear portion 16 of the vehicle cabin 18. The outlet 50 may be in pneumatic communication with a second air plenum 54 that is configured to direct the second airstream 34 from the outlet 50 to the nozzle 52. The housing 36 of the air moving device 32 may additionally define a mixing box 48 that is configured to mix the first airstream 30 with the cabin air 44 to form the second airstream 34.

The HVAC system 10 may be configured so that any or every heat exchanger included in the HVAC system 10 is located in the front portion 24 of the vehicle 12.

Continuing to refer to FIG. 1, the HVAC system 10 may further include a control vane 56 coupled to a servo mechanism 58 configured to control the first airstream 30. The control vane 56 may be configured to reduce the volume of the first airstream 30 flowing to the air moving device 32 and thereby reduce the volume of the first airstream 30. The HVAC system 10 may also include an occupant sensor 60 configured to determine the presence of an occupant 14 in the rear portion 16 of the vehicle cabin 18. The occupant sensor 60 may be a pressure based sensor configured to detect a weight of an occupant 14 in a seat. The occupant sensor 60 may alternatively be an electrical field sensor configured to detect an occupant 14 in a seat by a change in an electric field generated by the sensor. The design and construction of pressure based and electrical field based occupant sensors are well known to those skilled in the art.

The HVAC system 10 may also include a controller 62 in communication with the occupant sensor 60 and the servo mechanism 58. The controller 62 may preferably be an electronic controller in electrical communication with the occupant sensor 60 and the servo mechanism 58; however the controller 62 may alternately be a pneumatic controller or hydraulic controller that is in pneumatic or hydraulic communication with the occupant sensor 60 and servo mechanism 58. The controller 62 may be configured to reduce the flow rate of the first airstream 30 when the occupant sensor 60 does not detect the presence of an occupant 14 in the rear portion 16 of the vehicle cabin 18. The controller 62 may also be configured to control the flow rate of the first airstream 30 and thereby control the ratio of the first airstream 30 to cabin air 44 in the second airstream 34.

The controller 62 may also be in communication with the air moving device 32. The controller 62 may be configured to control the air moving device 32 effective to reduce the flow rate of the second airstream 34 when the occupant sensor 60 does not detect the presence of an occupant 14 in the rear portion 16 of the vehicle cabin 18. The controller 62 provides the advantage of reducing the electrical power required by the air moving device 32 to generate the second airstream 34 when an occupant 14 is not detected in the rear portion 16 of the cabin. The controller 62 may also be configured to control the flow rate of the cabin air 44 into the air moving device 32 by controlling the speed of the air blower 46 and thereby control the ratio of the first airstream 30 to cabin air 44 in the second airstream 34.

The controller 62 may include a microprocessor or application specific integrated circuit (ASIC) configured to control the servo mechanism 58 and the air moving device 32 based upon input from the occupant sensor 60. Software that configures the microprocessor or ASIC to control the servo mechanism 58 and air moving device 32 may be stored in non-volatile (NV) memory within the controller 62. Non-limiting examples of the types of NV memory that may be used include electrically erasable programmable read only memory (EEPROM), masked read only memory (ROM) and flash memory. The controller 62 may also include analog to digital (A/D) convertor circuits and digital to analog (D/A) convertor circuits to allow the convertor to establish electrical communication with the servo mechanism 58, air moving device 32, and other electronic devices, such as the occupant sensor 60.

Following is a non-limiting example of operating the HVAC system 10 to provide cooling. The temperatures and air flow rates shown may vary depending of vehicle cabin 18 geometry and construction. The heat exchanger 28 may cool an airstream to a temperature of about 12° C. (about 54 degrees Fahrenheit). As used herein, a temperature of "about X° C." is equal to X±2° C. A second air moving device 64, such as a fan, disposed in the front portion 24 of the vehicle 12 may induce a flow rate of this airstream of about 118 L/s (250 CFM) at high ambient temperature. A first portion of the airstream having a flow rate of about 47.2 L/s (100 CFM) may be delivered to the front portion 24 of the vehicle cabin 18 to establish an air temperature in the front portion 24 of the vehicle cabin 18 of about 24° C. (about 75 degrees Fahrenheit). A second portion of the airstream having a flow rate of about 47.2 L/s (100 CFM) may be delivered to the rear portion 16 of the vehicle cabin 18 to establish an air temperature in the rear portion 16 of the vehicle cabin 18 of about 30° C. (86 degrees Fahrenheit). A third portion of the airstream is defined as the first airstream 30 having a flow rate of about 23.6 L/s (50 CFM) and may be directed to the first plenum 40 running to the rear portion 16 of vehicle 12.

The first plenum 40 may direct the first airstream 30 to a first inlet 38 of an air moving device 32 located in the rear portion 16 of the vehicle 12. The air moving device 32 may mix the first airstream 30 with cabin air 44 to form the second airstream 34 having a flow rate of about 94.4 L/s (200 CFM) and a second temperature of about 24° C. (about 75 degrees Fahrenheit).

The first plenum 40 may be sized to accommodate the flow rate of the first airstream 30 (about 23.6 L/s, 50 CFM) rather than the flow rate of the second airstream 34 (about 94.4 L/s, 200 CFM) as may be required if the second airstream 34 were generated in the front portion 24 of the vehicle 12 rather than in the rear portion 16 of the vehicle 12. This may offer an advantage of a smaller first plenum 40 that is easier to package in the vehicle 12. The lower flow rate of the first airstream 30 may also provide an energy savings because an air moving device generating the flow rate may require less energy and generate less noise to create a flow rate of 23.6 L/s (50 CFM) versus 94.4 L/s (200 CFM). The air moving device 32 may require less energy to generate the flow rate of the second airstream 34 because the cabin air 44 drawn from the rear portion 16 of the vehicle 12 does not require a long plenum run from the front portion 24 of the vehicle 12 and so does not have to overcome the pressure losses associated with a long plenum.

The second airstream 34 may be directed to a plurality of nozzles 52 directed to occupants 14 in the second row seats 20 and occupants 14 in the third row seats 22 in the rear portion 16 of the vehicle cabin 18. Each nozzle 52 may be configured to deliver an airstream having a flow rate of about 15.7 L/s (33 CFM). The nozzle 52 may be directed toward the location of a thermally sensitive portion of the body of the occupant 14. When the HVAC system 10 is configured to cool the vehicle cabin 18, the thermally sensitive portion may be a head portion 66, a chest portion 68, and/or a lap portion 70 of the body of the occupant 14.

In order to provide enhanced thermal comfort to the occupant 14 during HVAC system start-up when the vehicle cabin 18 temperatures are above the desired ambient temperatures, it may be desirable to provide additional cooling during a HVAC system start-up period until a threshold time is reached. The first temperature and the second temperature may be at the lowest temperature that can be supplied by the heat exchanger when an elapsed system run time is under the threshold time in order to establish an air temperature in the rear portion 16 of the vehicle cabin 18 of about 30° C. (about 86 degrees Fahrenheit) as quickly as possible. The threshold time may be based upon the initial ambient temperature within the vehicle cabin 18. When the elapsed system run time is over the threshold time and the HVAC system 10 is running at a steady state temperature, the first temperature may preferably be about 12° C. (about 54 degrees Fahrenheit) and the second temperature may preferably be about 24° C. (about 75 degrees Fahrenheit). After the elapsed system run time is over the threshold time, the first temperature and the second temperature may gradually increase based on a linear function, an exponential function, or some other time-based function.

As non-limiting example of operating the HVAC system 10 to provide heating, an airstream may be directed into the vehicle cabin 18 effective to establish an cabin air temperature of about 16° C. (about 61 degrees Fahrenheit) in the rear portion 16 of the vehicle cabin 18. In order to provide enhanced thermal comfort to the occupant 14 during HVAC system start-up when the vehicle cabin temperatures are below the desired operating temperatures, it may be desirable to provide additional heating during a HVAC system start-up period. The first temperature and the second temperature may be at the highest temperature that can be supplied by the heat exchanger when an elapsed system run time is under the threshold time in order to establish an air temperature in the rear portion 16 of the vehicle cabin 18 of about 16° C. (about 61 degrees Fahrenheit) as quickly as possible. The first temperature may preferably be about 45° C. (about 114 degrees Fahrenheit) and the second temperature may preferably be about 35° C. (about 95 degrees Fahrenheit) when the elapsed system run time is over the threshold time. After the elapsed system run time is over the threshold time, the first temperature and the second temperature may gradually decrease based on a linear function, an exponential function, or some other time-based function.

When the HVAC system 10 is configured to heat the vehicle cabin 18, the thermally sensitive portion of the body of the occupant 14 may be a foot portion 72, a chest portion 68, and/or a hand portion 74 of the body of the occupant 14.

Accordingly, an HVAC system 10, a controller 62 for the HVAC system 10 and an air moving device 32 for the HVAC system 10 is provided. The HVAC system 10 provides the benefit of reduced energy consumption due to maintaining an ambient temperature in the rear portion 16 of the cabin higher or lower than the temperature in the front portion 24 of the vehicle cabin 18. The HVAC system 10 may provide the benefit of additional energy saving due to a reduction in the flow rate of the first airstream 30 that runs from the heat exchanger 28 in the front portion 24 of the vehicle 12 to the air moving device 32 that may be located in the rear portion 16 of the vehicle 12. The HVAC system 10 may require a plenum having a smaller cross section to deliver the first airstream 30, thereby simplifying packaging of the plenum in the vehicle 12.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A heating, ventilation, and air conditioning system configured to provide a perceived comfortable thermal environment, said system comprising:
   a first air moving device and a heat exchanger disposed in a front portion of a cabin of a vehicle, said first air moving device configured to pass a first airstream through said heat exchanger to provide the first air stream having a first temperature;
   a second air moving device enclosed within a mixing box disposed in a rear portion of the cabin of the vehicle and configured to mix the first airstream with a portion of cabin air to generate a second airstream characterized as having a second temperature, wherein the second airstream comprises a mixture of the first airstream and the portion of cabin air drawn from the rear portion of the cabin and wherein each and every heat exchanger in said system is disposed in the front portion of the cabin of the vehicle;
   a nozzle configured to direct the second airstream toward a location of an occupant in the rear portion of the cabin;
   wherein the system further comprises: a servo mechanism configured to move a control vane that is configured to control the flow rate of the first airstream;

an occupant sensor configured to determine the presence of an occupant in the rear portion of the cabin; and, a controller in communication with the occupant sensor and the servo mechanism, wherein the controller is configured to command the servo mechanism to reduce the flow rate of the first airstream when the occupant sensor does not detect the presence of an occupant in the rear portion of the cabin.

2. The system of claim 1, wherein the controller is in communication with the second air moving device and wherein the controller is configured to control the second air moving device effective to reduce the flow rate of the second airstream when the occupant sensor does not detect the presence of an occupant in the rear portion of the cabin.

3. The system of claim 1, wherein a mixing ratio of the mixture of the first airstream and the cabin air drawn from a rear portion of the cabin is between 1:2 and 2:7.

4. The system of claim 1, wherein said system is configured to cool the cabin and wherein a portion of the first airstream is directed into the cabin effective to establish a cabin air temperature of about 30° C. in the rear portion of the cabin.

5. The system of claim 4, wherein the nozzle is directed toward the location of a portion of the occupant selected from the group consisting of a head portion, a chest portion, and a lap portion.

6. The system of claim 5, wherein said system is configured to heat the cabin and wherein a portion of the first airstream is directed into the cabin effective to establish a cabin air temperature of about 16° C. in the rear portion of the cabin.

7. The system of claim 6, wherein the first temperature is about 45° C. and the second temperature is about 35° C. when an elapsed system run time exceeds a threshold time.

8. The system of claim 7, wherein the nozzle is directed toward the location of a portion of the occupant selected from the group consisting of a foot portion, a chest portion, and a hand portion.

9. The system of claim 4, wherein the first temperature is about 12° C. and wherein the second temperature is about 24° C. when an elapsed system run time exceeds a threshold time.

10. The system of claim 1, wherein the controller is configured to control a flow rate of the cabin air into mixing box by controlling a speed of the second air moving device and thereby control a mixing ratio of the mixture of the first airstream and the cabin air drawn from a rear portion of the cabin.

* * * * *